(12) United States Patent
Suzuki

(10) Patent No.: US 8,964,055 B2
(45) Date of Patent: Feb. 24, 2015

(54) COMBINING IMAGES BASED ON POSITION OFFSET DETECTION OF A SERIES OF IMAGES

(71) Applicant: Olympus Corporation, Shibuya-ku, Tokyo (JP)

(72) Inventor: Daisuke Suzuki, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/898,388

(22) Filed: May 20, 2013

(65) Prior Publication Data

US 2013/0250146 A1    Sep. 26, 2013

Related U.S. Application Data

(63) Continuation of application No. PCT/JP2011/076367, filed on Nov. 16, 2011.

(30) Foreign Application Priority Data

Nov. 22, 2010   (JP) ................. 2010-260168

(51) Int. Cl.
- *H04N 5/235* (2006.01)
- *G03B 7/00* (2014.01)
- *H04N 5/262* (2006.01)
- *H04N 5/265* (2006.01)
- *H04N 5/232* (2006.01)

(52) U.S. Cl.
CPC ........... *H04N 5/265* (2013.01); *H04N 5/23264* (2013.01); *H04N 5/2355* (2013.01)
USPC ............. 348/221.1; 348/229.1; 348/362; 348/239

(58) Field of Classification Search
None
See application file for complete search history.

(56) References Cited

U.S. PATENT DOCUMENTS

| 2010/0053349 A1* | 3/2010 | Watanabe et al. .......... 348/222.1 |
| 2010/0092151 A1* | 4/2010 | Miyakoshi .................. 386/68 |
| 2010/0158402 A1* | 6/2010 | Nagase et al. ............... 382/255 |

FOREIGN PATENT DOCUMENTS

| JP | 07-75026 A | 3/1995 |
| JP | 2003-009006 A | 1/2003 |
| JP | 2003-009006 | * 10/2003 |
| JP | 2010226314 A | 10/2010 |
| JP | 2012-019337 | * 1/2012 |

OTHER PUBLICATIONS

Japanese Office Action dated Jun. 3, 2014 in counterpart Japanese Application No. 2010-260168.
International Search Report (ISR) dated Feb. 21, 2012 (and English translation thereof) issued in parent International Application No. PCT/JP2011/076367.

* cited by examiner

*Primary Examiner* — Aung S Moe
*Assistant Examiner* — Euel Cowan
(74) *Attorney, Agent, or Firm* — Holtz, Holtz, Goodman & Chick PC

(57) ABSTRACT

An image processing apparatus includes an imaging unit that is configured to acquire a plurality of images with different exposure times, a position offset detection unit that is configured to detect a position offset between a plurality of images filmed by the imaging unit, a combining ratio calculation unit that is configured to calculate a combining ratio in case of combining the plurality of images based on pixel values of at least one image among the plurality of images filmed by the imaging unit and the amount of the position offset detected by the position offset detection unit, and an image combining unit that is configured to combine the plurality of images based on the combining ratio calculated by the combining ratio calculation unit.

6 Claims, 9 Drawing Sheets

COMBINING IMAGES BASED ON POSITION OFFSET DETECTION OF A SERIES OF IMAGES

CROSS REFERENCE TO RELATED APPLICATIONS

This application is a continuation of International Patent Application No. PCT/JP2011/076367, filed on Nov. 16, 2011, which claims the benefit of Japanese Patent Application No. JP 2010-260168, filed on Nov. 22, 2010, which is incorporated by reference as if fully set forth.

TECHNICAL FIELD

The present invention relates to an image processing technology, in particular to a technology that combines two images with different exposure times.

BACKGROUND ART

Since the dynamic range of a solid-state image sensor represented by a CCD (Charge Coupled Device) image sensor and a CMOS (Complement Metal Oxide Semiconductor) image sensor is very narrow compared with human being's degree of vision, a technique is known in which the dynamic range is expanded by combining a plurality of images with the different amount of exposure (refer to JP 7-75026 A).

Also known is a technology in which a plurality of images with different exposure times are combined by taking account of a position offset among images (refer to JP 2003-9006 A).

SUMMARY OF THE INVENTION

An image processing apparatus of an aspect of the present invention includes an imaging unit that is configured to acquire a plurality of images with different exposure times, a position offset detection unit that is configured to detect a position offset between a plurality of images filmed by the imaging unit, a combining ratio calculation unit that is configured to calculate a combining ratio in case of combining the plurality of images based on pixel values of at least one image among the plurality of images filmed by the imaging unit and the amount of the position offset detected by the position offset detection unit, and an image combining unit that is configured to combine the plurality of images based on the combining ratio calculated by the combining ratio calculation unit.

An image processing method of another aspect of the present invention includes the steps of acquiring a plurality of images with different exposure times, detecting a position offset between the acquired plurality of images, calculating a combining ratio in case of combining the plurality of images based on pixel values of at least one image among the acquired plurality of images and the detected amount of the position offset, and combining the plurality of images based on the calculated combining ratio.

A recording device of yet another aspect of the present invention stores an image processing program. The image processing program causes a computer to execute the steps of acquiring a plurality of images with different exposure times, detecting a position offset between the acquired plurality of images, calculating a combining ratio in case of combining the plurality of images based on pixel values of at least one image among the acquired plurality of images and the detected amount of the position offset, and combining the plurality of images based on the calculated combining ratio.

BRIEF DESCRIPTION OF THE DRAWINGS

FIG. 7(a) shows the short-exposure image signal Short, FIG. 7(b) shows the long-exposure image signal Long, FIG. 7(c) shows the combining ratio $\alpha$ for every region, and FIG. 7(d) shows the output image signal Sout.

FIG. 8(a) shows the short-exposure image signal Short, FIG. 8(b) shows the long-exposure image signal Long, FIG. 8(c) shows the combining ratio $\alpha$ for every region, and FIG. 8(d) shows the output image signal Sout.

FIG. 9(a) shows the short-exposure image signal Short, FIG. 9(b) shows the long-exposure image signal Long, FIG. 9(c) shows the amount of a position offset diff, FIG. 9(d) shows the combining ratio $\alpha$ for every region, FIG. 9(e) shows the combining ratio $\alpha'$ for every region, and FIG. 9(f) shows the output image signal Sout.

DESCRIPTION OF THE EMBODIMENTS

First Embodiment

Figure 1:
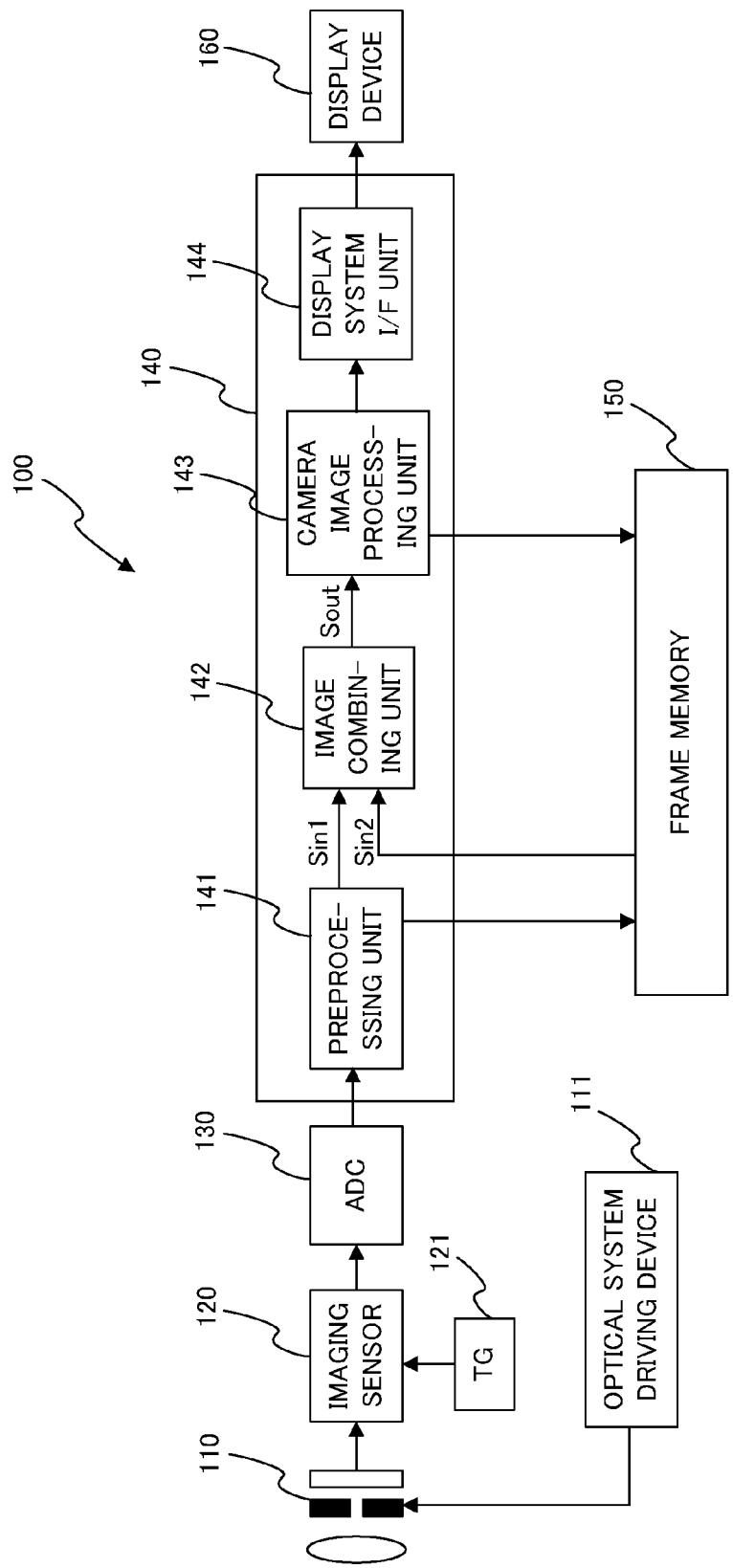
FIG. 1 is a block diagram showing the main configuration of an image processing apparatus according to a first embodiment of the present invention.

FIG. 1 is a block diagram showing the main configuration of an image processing apparatus 100 according to a first embodiment of the present invention.

The image processing apparatus 100 is an image processing apparatus having a function that display in real time an image captured by an imaging system such as, for example, a digital still camera, a digital video camera, a surveillance camera and a mobile terminal with a digital camera, or is an image processing apparatus that records the image as a picture.

An imaging optical system 110 consists of, for example, an optical lens, a diaphragm, an optical low pass filter, etc., by which the image of an object is formed on an imaging sensor 120. An optical system driving device 111 drives the imaging optical system 110 mechanically based on a signal from a central processing unit that is not illustrated.

The image sensor 120 is, for example, a CCD image sensor or a CMOS image sensor, and converts image information of light formed on a light receiving surface into an analog voltage signal by performing photoelectric conversion. A timing generator (TG) 121 generates signals for driving the imaging sensor 120, which are, for example, a vertical/horizontal synchronizing signal, an electronic shutter pulse, a read-out pulse and the like.

An A/D converter (ADC) 130 further converts the image information, which has been converted into the analog voltage signal by the image sensor 120, into a digital voltage signal, and supplies the digital voltage signal to a latter signal processing unit 140.

The signal processing unit 140 comprises a preprocessing unit 141, an image combining unit 142, a camera image processing unit 143 and a display system I/F unit 144.

The preprocessing unit 141 performs image processing for an image signal supplied from the A/D converter 130. The image processing performed here includes processing which is desirably performed for so-called RAW data such as, for example, optical black correction, pixel defect correction and the like, or processing which must be inevitably performed for RAW data. The image signal after being processed is supplied to the latter image combining unit 142, and is stored in a frame memory 150.

The image combining unit 142 combines an image signal Sin1 supplied from the preprocessing unit 141 with an image signal Sin2 supplied from the frame memory 150. The image signal Sin2 is obtained just before the image signal Sin1 and is filmed with a different exposure time from that of Sin1. In this embodiment, a long-exposure image with a long exposure time and a short-exposure image with a short exposure time are alternately acquired by filming. That is, between the image signal Sin1 and the image signal Sin2, one is a long-exposure image signal and the other is a short-exposure image signal. The detailed configuration inside the image combining unit 142 will be described later with reference to FIG. 2.

The camera image processing unit 143 performs processing such as, for example, Y/C separation processing, gray scale conversion, color correction, noise reduction and the like for an image signal Sout output from the image combining unit 142. When the image sensor 120 is a single plate type one, the camera image processing unit 143 also performs demosaicing processing, edge correction processing and the like. The image after being processed by the camera image processing unit 143 is supplied to the display system I/F unit 144, and is stored in the frame memory 150. The image stored in the frame memory 150 is used at a compression recording unit, which is not illustrated, and the like.

The display system I/F unit 144 performs processing of converting an image signal output from the camera image processing unit 143 into a signal in a form adapted to the characteristic or the specification of a display device 160. Specifically, for example, clipping and resizing processing of an image, the superposition of a character related to user interface and a symbol image, etc. are performed.

The display device 160 is, for example, a liquid crystal panel, an electronic view finder, etc., and displays an image according to an image signal input via the display system I/F unit 144.

Figure 2:
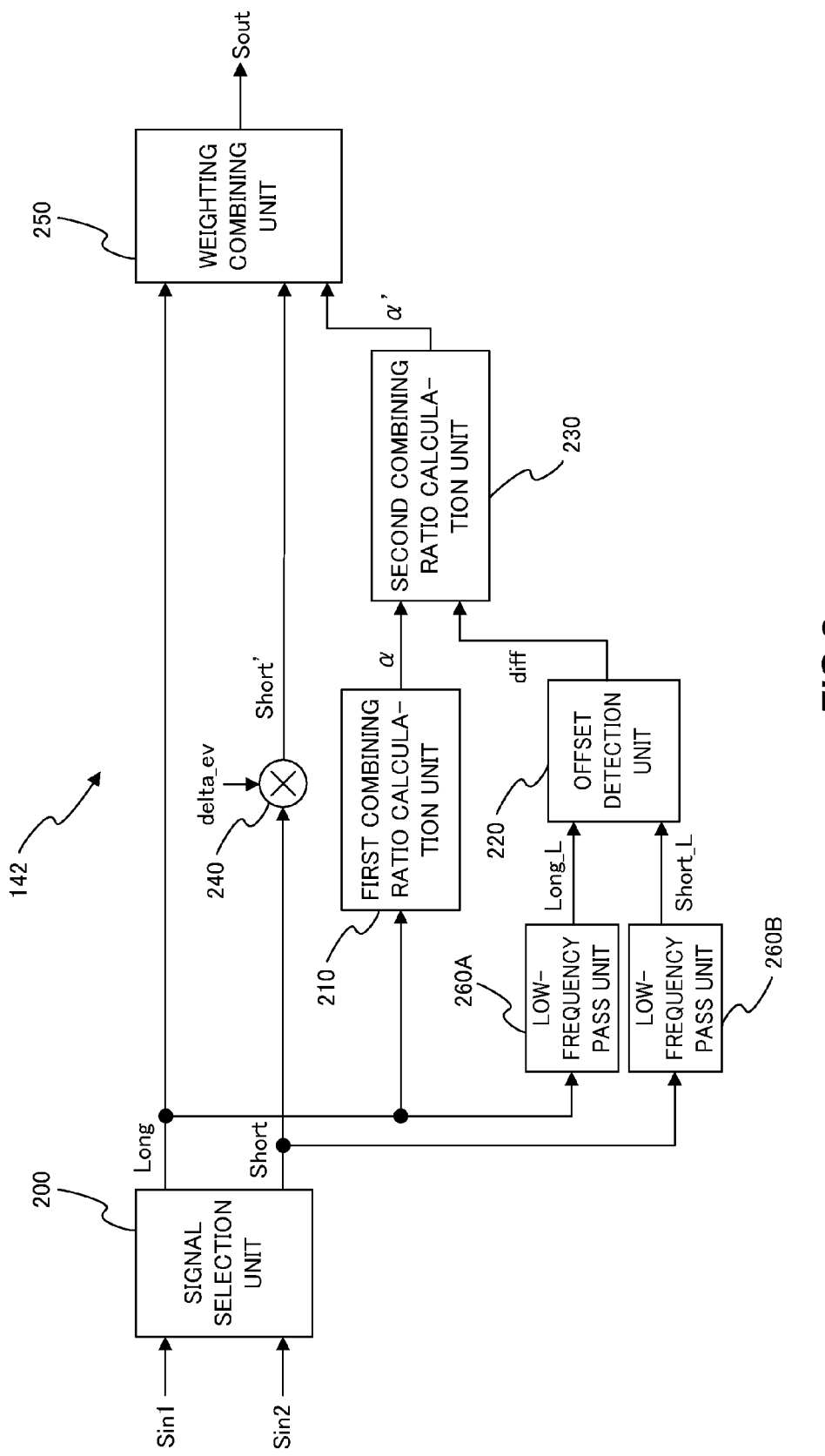
FIG. 2 is a block diagram showing the detailed internal configuration of the image combining unit.

FIG. 2 is a block diagram showing the detailed internal configuration of the image combining unit 142. The image combining unit 142 comprises a signal selection unit 200, a first combining ratio calculation unit 210, an offset detection unit 220, a second combining ratio calculation unit 230, a multiplier 240, a weighting combining unit 250, and low-frequency pass units 260A and 260B.

The signal selection unit 200 distinguishes the image signal Sin1 supplied from the preprocessing unit 141 and the image signal Sin2 supplied from the frame memory 150 into a long-exposure image signal Long and a short-exposure image signal Short. Here, it is presupposed that values which the long-exposure image signal Long and the short-exposure image signal Short can take are 0 or more and are 1 or less. It is presupposed that a signal value 0 indicates a black level and a signal value 1 indicates a saturation level.

Figure 3:
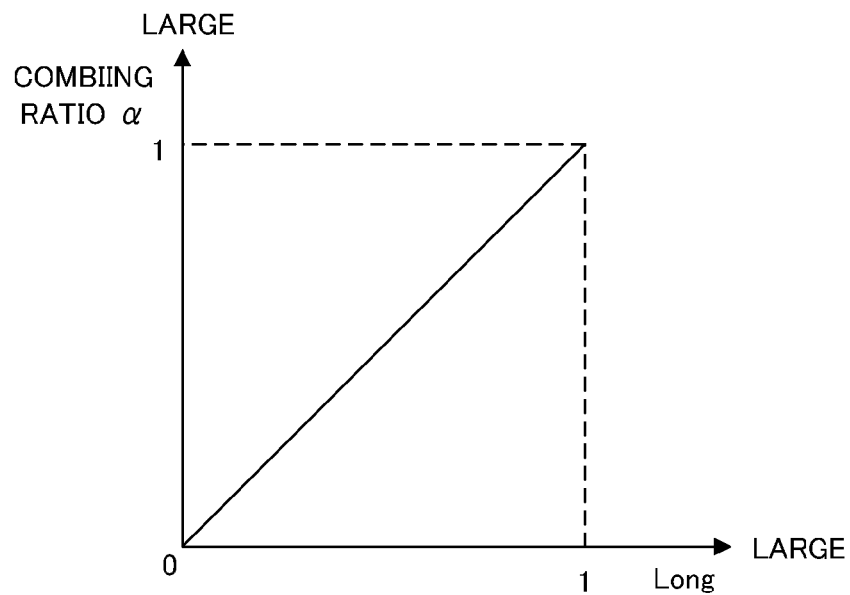
FIG. 3 is a graph showing the relationship between the long-exposure image signal Long and the combining ratio $\alpha$.

The first combining ratio calculation unit 210 calculates a combining ratio α based on the long-exposure image signal Long. The combining ratio α is the ratio of the short-exposure image in an image after being combined, and a value which it can take is 0 or more and is 1 or less. The combining ratio α is proportional to the magnitude of the long-exposure image signal Long. FIG. 3 is a graph showing the relationship between the long-exposure image signal Long and the combining ratio α.

The low-frequency pass unit 260A creates a signal Long_L which is obtained by removing a high-frequency component from the long-exposure image signal Long, and outputs the signal Long_L to the offset detection unit 220. The low-frequency pass unit 260B creates a signal Short_L which is obtained by removing a high-frequency component from the short-exposure image signal Short, and outputs the signal Short_L to the offset detection unit 220.

The offset detection unit 220 determines the part of a position offset and the amount of a position offset between the long-exposure image signal Long_L, which is obtained by removing a high-frequency component by the low-frequency pass unit 260A, and the short-exposure image signal Short_L, which is obtained by removing a high-frequency component by the low-frequency pass unit 260B. For this reason, delta_ev (=the exposure time of Long/the exposure time of Short), which is the ratio of the long-exposure image signal Long and the short-exposure image signal Short, is first determined, and by using the following formula (1), a short-exposure image signal Short_L', which is a form standardized by delta_ev, is determined.

$$\text{Short\_L}' = \begin{cases} 1 & \ldots (\text{Short\_L} \times \text{delta\_ev} > 1) \\ \text{Short\_L} \times \text{delta\_ev} & \ldots (\text{Short\_L} \times \text{delta\_ev} \leq 1) \end{cases} \quad (1)$$

Next, using the following formula (2), the absolute value of a difference between the long-exposure image signal Long_L and the short-exposure image signal Short_L', which is determined by using the formula (1), is calculated as an amount of a position offset "diff".

$$\text{diff} = |\text{Long\_}L - \text{Short\_}L'| \quad (2)$$

The second combining ratio calculation unit 230 calculates a combining ratio α' based on the combining ratio α, which is calculated by the first combining ratio calculation unit 210, and the amount of a position offset diff, which is calculated by the offset detection unit 220. The combining ratio α' is defined by a function such that the combining ratio α' is equal to the combining ratio α where the amount of a position offset diff is zero, that is, for a part where there is no movement between images and such that the combining ratio α' approaches 0.5 as the amount of a position offset diff becomes large. An example of such a function is shown in the following formula (3). In the formula (3), C is a predetermined coefficient for adjusting the amount of position offset correction.

$$\alpha' = \frac{\alpha - 0.5}{1 + \text{diff} \times C} + 0.5 \quad (3)$$

Figure 4:
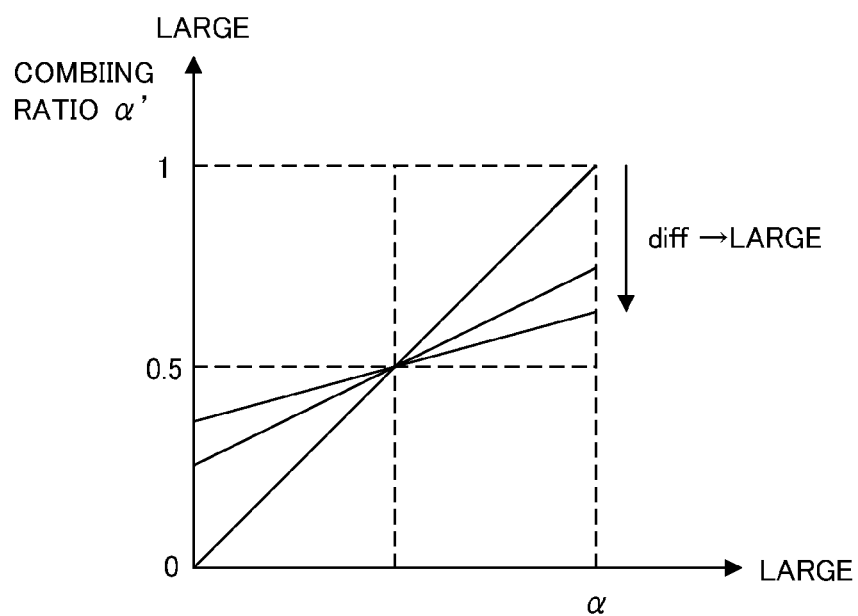
FIG. 4 is a graph showing the relationship of the combining ratio $\alpha$ and the combining ratio $\alpha'$.

FIG. 4 is a graph showing a function defined by the formula (3), and the horizontal axis denotes the combining ratio α and the vertical axis denotes the combining ratio α'. FIG. 4 shows three graphs according to the different amount of a position offset diff, and it is seen that the combining ratio α' approaches 0.5 for the same combining ratio α as diff becomes large.

The multiplier 240 performs multiplying the short-exposure image signal Short and delta_ev which is the ratio of exposure time, and calculates a short-exposure image signal Short', which is obtained after the multiplication (refer to the formula (4)).

$$\text{Short}' = \text{Short} \times \text{delta\_ev} \quad (4)$$

The weighting combining unit 250 determines an output image signal Sout, i.e. combined image signal, by combining the long-exposure image signal Long and the short-exposure image signal Short' output from the multiplier 240 with the combining ratio α' calculated by the second combining ratio calculation unit 230. Here, using the following formula (5), the output image signal Sout is calculated.

$$\text{Sout} = \alpha' \times \text{Short}' + (1 - \alpha') \times \text{Long} \quad (5)$$

In this case, a value obtained by multiplying a dynamic range, which the short-exposure image signal has, and delta_ev, which is the ratio of exposure time, becomes the dynamic range of the output image signal Sout. That is, the dynamic range is expanded by delta_ev times or by $\log_2(\text{delta\_ev})$ bit.

Figure 5:
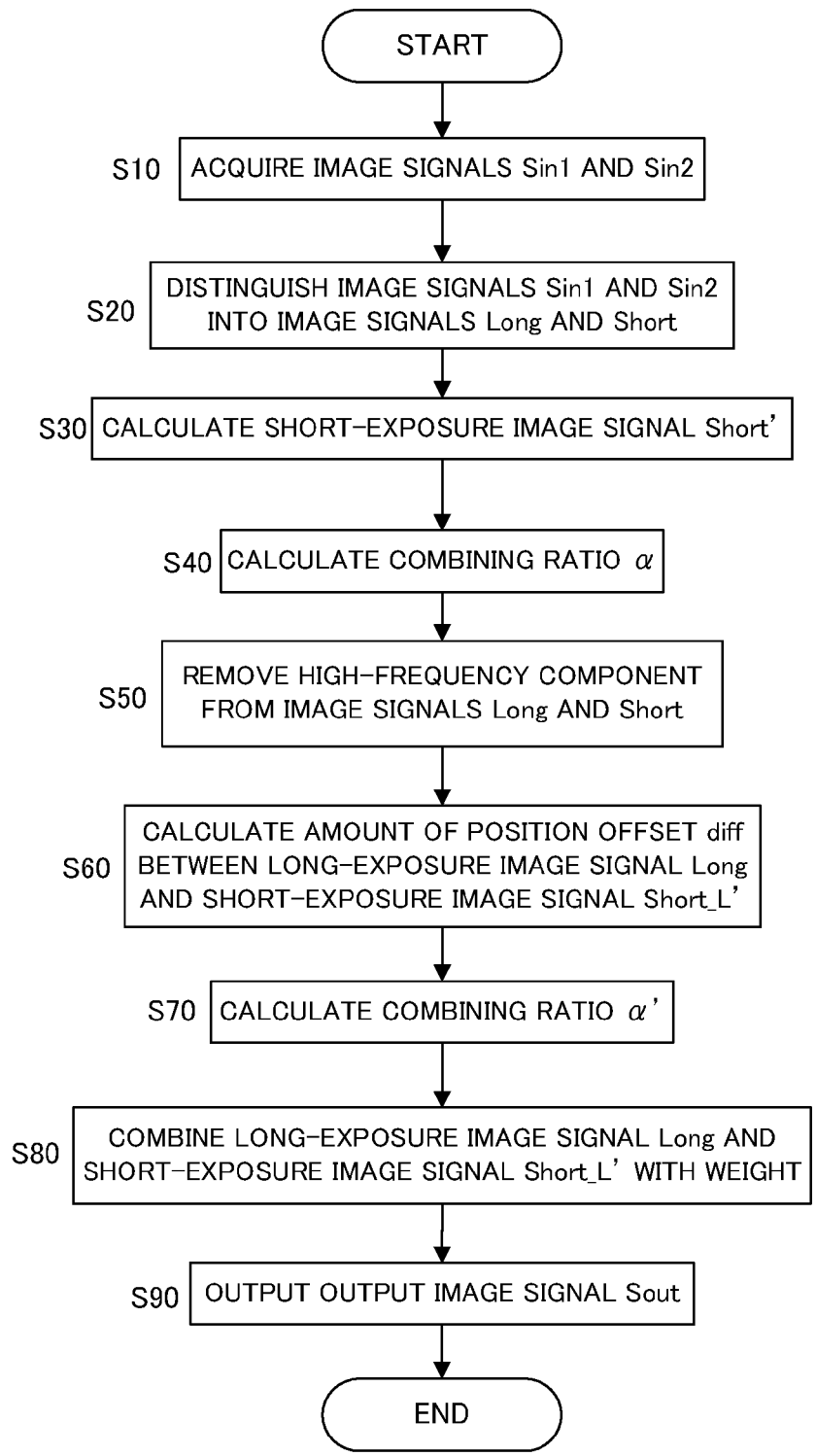
FIG. 5 is a flow chart showing the flow of processing performed inside the image combining unit.
Figure 6:
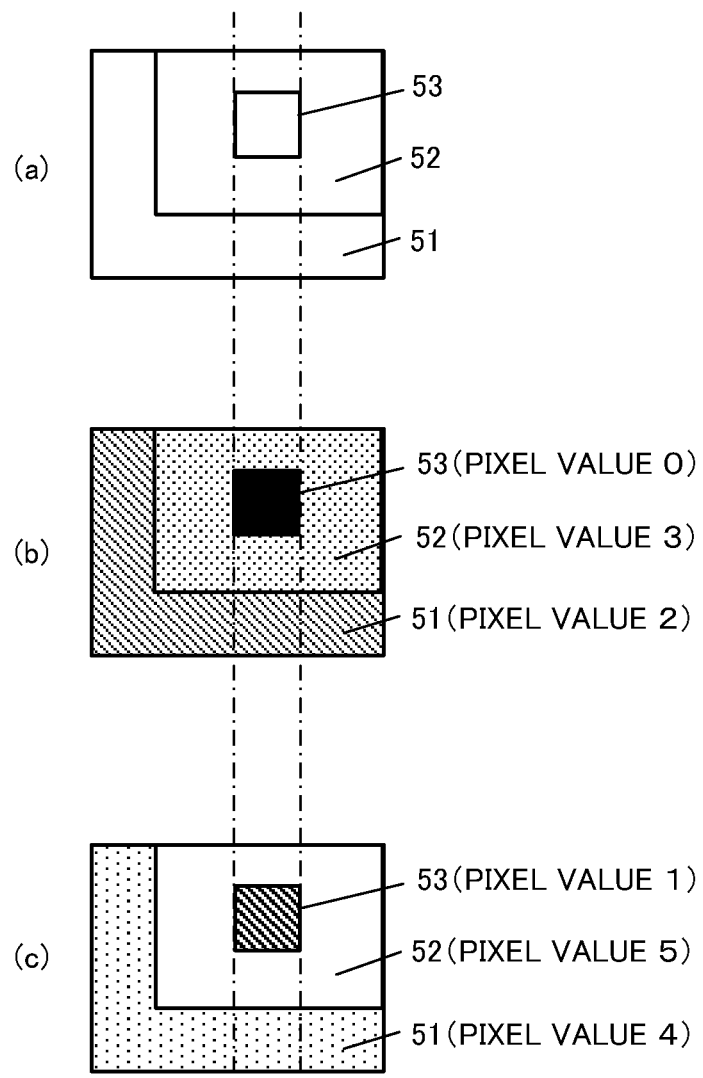
FIG. 6(a) is a diagram showing a certain filmed scene.
FIG. 6(b) shows the short-exposure image signal Short acquired by filming the scene in FIG. 6(a)
FIG. 6(c) shows the long-exposure image signal Long acquired by filming the scene in FIG. 6(a).

FIG. 5 is a flow chart showing the flow of processing performed inside the image combining unit 142. However, the order of the processing performed inside image combining unit 142 is not limited to the order of the steps of the flow chart shown in FIG. 5.

In a step S10, the signal selection unit 200 acquires the image signal Sin1 from the preprocessing unit 141, and also acquires the image signal Sin2 from the frame memory 150.

In a step S20, the signal selection unit 200 distinguishes the image signals Sin1 and Sin2 acquired in the step 10 into the long-exposure image signal Long and the short-exposure image signal Short.

In a step S30, the multiplier 240 calculates a short-exposure image signal Short' by multiplying the short-exposure image signal Short and delta_ev, which is the ratio of exposure time between the long-exposure image signal Long and short-exposure image signal Short.

In a step S40, the first combining ratio calculation unit 210 calculates the combining ratio α based on the long-exposure image signal Long.

In a step S50, the low-frequency pass units 260A and 260B removes high-frequency components from the long-exposure image signal Long and the short-exposure image signal Short, and creates a signal Long_L and Short_L, respectively, after the high-frequency components are removed.

In a step S60, the offset detection unit 220 determines the amount of a position offset diff between the long-exposure image signal Long_L and the short-exposure image signal Short_L.

In a step S70, the second combining ratio calculation unit 230 calculates the combining ratio α' based on the combining ratio α calculated in the step S40 and the amount of a position offset diff calculated in the step S60.

In a step S80, the weighting combining unit 250 determines the output image signal Sout by combining the long-exposure image signal Long and the short-exposure image signal Short' output from the multiplier 240 with the combining ratio α' calculated in the step S70.

In a step S90, the weighting combining unit 250 outputs the output image signal Sout determined in the step S80 to the camera image processing unit 143.

By performing the processing from the steps S10 to S90 mentioned above, a combined image with an expanded dynamic range can be created. In addition, while a moving image is filmed with the long-exposure image signal Long and the short-exposure image signal Short filmed alternately and repeatedly, by performing the steps S10 to S90 repeatedly, the moving image with an expanded dynamic range can be created.

The expansion of a dynamic range will be explained in detail with reference to FIG. 6 to FIG. 9.

FIG. 6(a) is a diagram showing a certain filmed scene. In FIG. 6(a), it is presupposed that the region 51 is an indoor wall surface, the region 52 is scenery outside a window and the region 53 is a moving object such as a car or a human being. It is presupposed that the brightness of the regions 51, 52 and 53 has the following relationship: region 52>region 51>region 53.

FIG. 6(b) and FIG. 6(c) are diagrams showing images acquired by filming the scene in FIG. 6(a). FIG. 6(b) shows the short-exposure image signal Short acquired by filming at the time of (t−1), and FIG. 6(c) shows the long-exposure image signal Long acquired by filming at the time of t. The exposure difference between the short-exposure image signal Short and the long-exposure image signal Long is one grade (1EV), and the ratio of exposure time delta_ev equals to 2.

Here, in order to simplify the explanation, it is presupposed that the resolving power of the AD converter 130 has five levels and the pixel value of the short-exposure image signal Short satisfies the relation of (region 51, region 52, region 53)=(2, 3, 0) and the pixel value of the long-exposure image signal Long satisfies the relation of (region 51, region 52, region 53)=(4, 5, 1). In this example, since the pixel value of the short-exposure image signal Short in the region 53 is zero, under exposure occurs, and since the pixel value of the long-exposure image signal Long in the region 52 is five, over exposure occurs.

Figure 7:
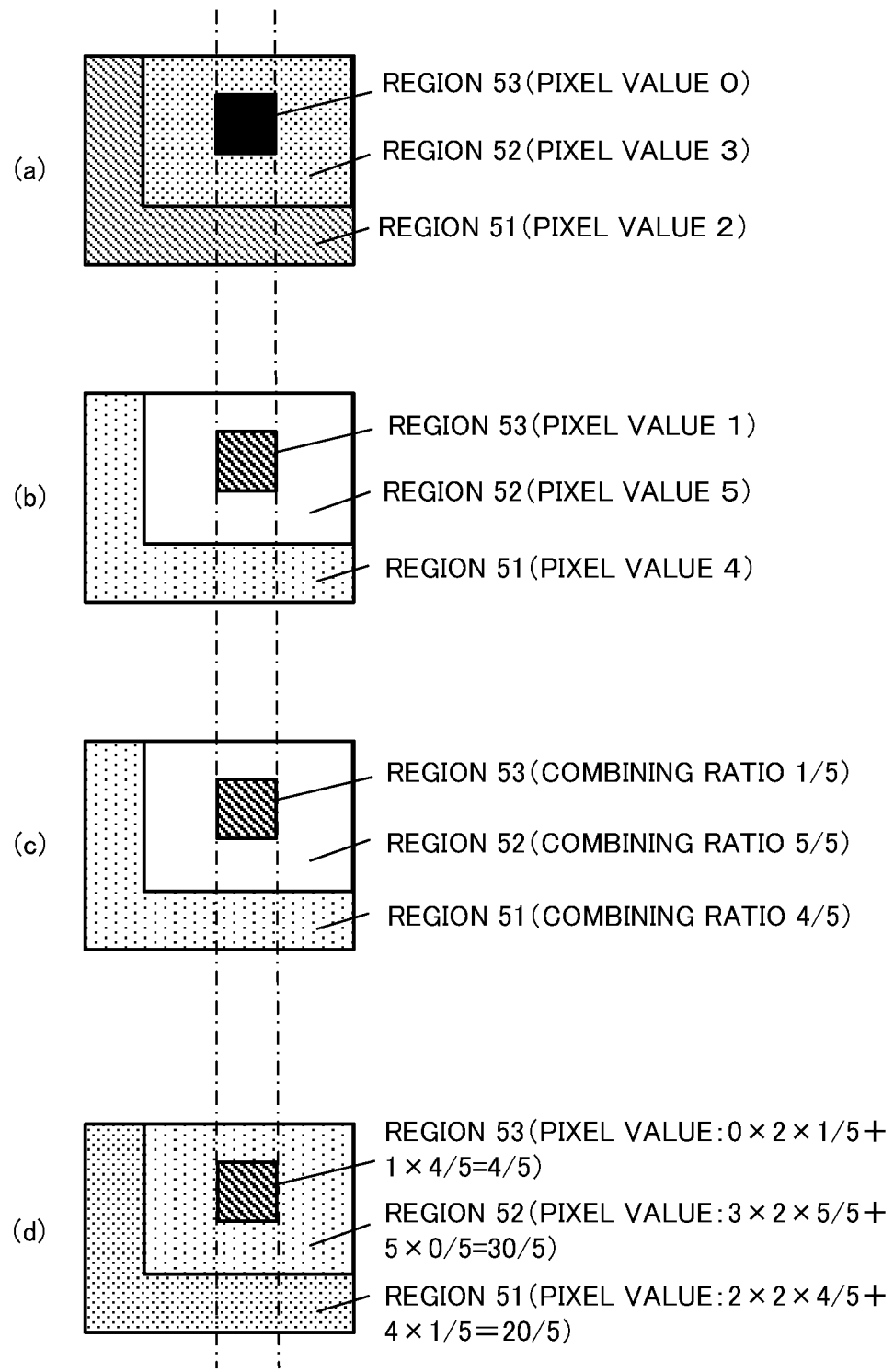
FIG. 7 is a diagram showing the creation process of the output image signal Sout when it is presupposed that a region 53 is not a moving object but is a static object.

FIG. 7 is a diagram showing the creation process of the output image signal Sout when it is presupposed that the region 53 is not a moving object but is a static object. FIG. 7(a) and FIG. 7(b) show the short-exposure image signal Short and the long-exposure image signal Long, respectively.

FIG. 7(c) is a diagram showing the combining ratio α for every region. As mentioned above, since the combining ratio α is proportional to the magnitude of the long-exposure image signal Long, the combining ratio of the regions 51, 52 and 53 are 4/5, 5/5, 1/5, respectively.

FIG. 7(d) is a diagram showing the output image signal Sout created by the weighting combining ratio 250. When a moving object does not exist, since the amount of a position offset diff is zero, the relation of a'=a is obtained using the formula (3). Accordingly, using the formulas (4) and (5), the pixel values of the regions 51, 52 and 53 in the output image signal Sout become 20/5, 30/5 and 4/5, respectively (refer to FIG. 7(d)). Since the dynamic range of the output image signal (combined image signal) Sout has ten levels of from 0 to 10, the under exposure of the region 53 and the over exposure of the region 52 have been improved.

Next, explanation will be given for a case where the region 53 is a moving object moving rightward on an image. In order to explain the effect of the present invention, a case where the position offset correction of the present invention is not applied will be first explained with reference to FIG. 8.

FIG. 8(a) and FIG. 8(b) are the short-exposure image signal Short and the long-exposure image signal Long, respectively. FIG. 8(c) is a diagram showing the combining ratio α for every region. Since the region 53 is moving rightward on the image from the time of (t−1) to the time of t, it is presupposed that the region 52a and the region 53a in FIG. 8(b) and FIG. 8(c) correspond to the region 52 and region 53, respectively, in FIG. 8(a).

FIG. 8(d) is a diagram showing the creation process of the output image signal Sout. Since the position offset correction is not applied, the predetermined coefficient C for adjusting the amount of the position offset correction in the formula (3) is zero. Accordingly, the relation of α'=α is obtained.

Since the region 53 is a moving object, a position offset arises between the long-exposure image signal Long and the short-exposure image signal Short. Accordingly, the output image signal Sout is divided into five regions of from region 71 to region 75. Using the formulas (4) and (5), the pixel values of regions of from 71 to 75 in the output image signal Sout become 0, 4/5, 10/5, 20/5, 30/5, respectively (refer to FIG. 8(d)). That is, the region 71 where the pixel value is 0 has become an under-exposure state on the image.

Next, explanation will be given for a case where the position offset correction of the present invention is applied, with reference to FIG. 9.

FIG. 9(a) and FIG. 9(b) are diagrams showing the short-exposure image signal Short and the long-exposure image signal Long, respectively.

FIG. 9(c) is a diagram showing the amount of a position offset diff between the short-exposure image signal Short and the long-exposure image signal Long. Here, in order to make the explanation easy, it is presupposed that the amount of a position offset diff of a region where the position offset has arisen between the short-exposure image signal Short and the long-exposure image signal Long is 1, the amount of a position offset diff of a region where no position offset has arisen is 0.

FIG. 9(d) is a diagram showing the combining ratio α for every region.

FIG. 9(e) is a diagram showing the combining ration a' for every region. The combining ratio α' can be calculated using the formula (3). Here, it is presupposed that the predetermined coefficient C in the formula (3) is 4.

FIG. 9(f) is a diagram showing the creation process of the output image signal Sout. Since the region 53 is a moving object, a position offset arises between the long-exposure image signal Long and the short-exposure image signal Short. Accordingly, the output image signal Sout is divided into five regions of from region 91 to region 95. Using the formula (4) and the formula (5), the pixel values of regions 91 to 95 in the output image signal Sout become 10/5, 4/5, 15/5, 20/5, 30/5, respectively (refer to FIG. 9(f)).

As shown in FIG. 9(e), when the position offset correction of the present invention is applied, the combining ratio α' of the region 91, where a position offset arises between the long-exposure image signal Long and the short-exposure image signal Short, is 3/5. Thereby, since the pixel value of the region 91 in the output image signal Sout becomes 10/5, under exposure does not occur on the image. That is, generating of an under-exposure twin image as shown in FIG. 8(d) is suppressed, and a natural twin image is expressed on the image.

Figure 8:
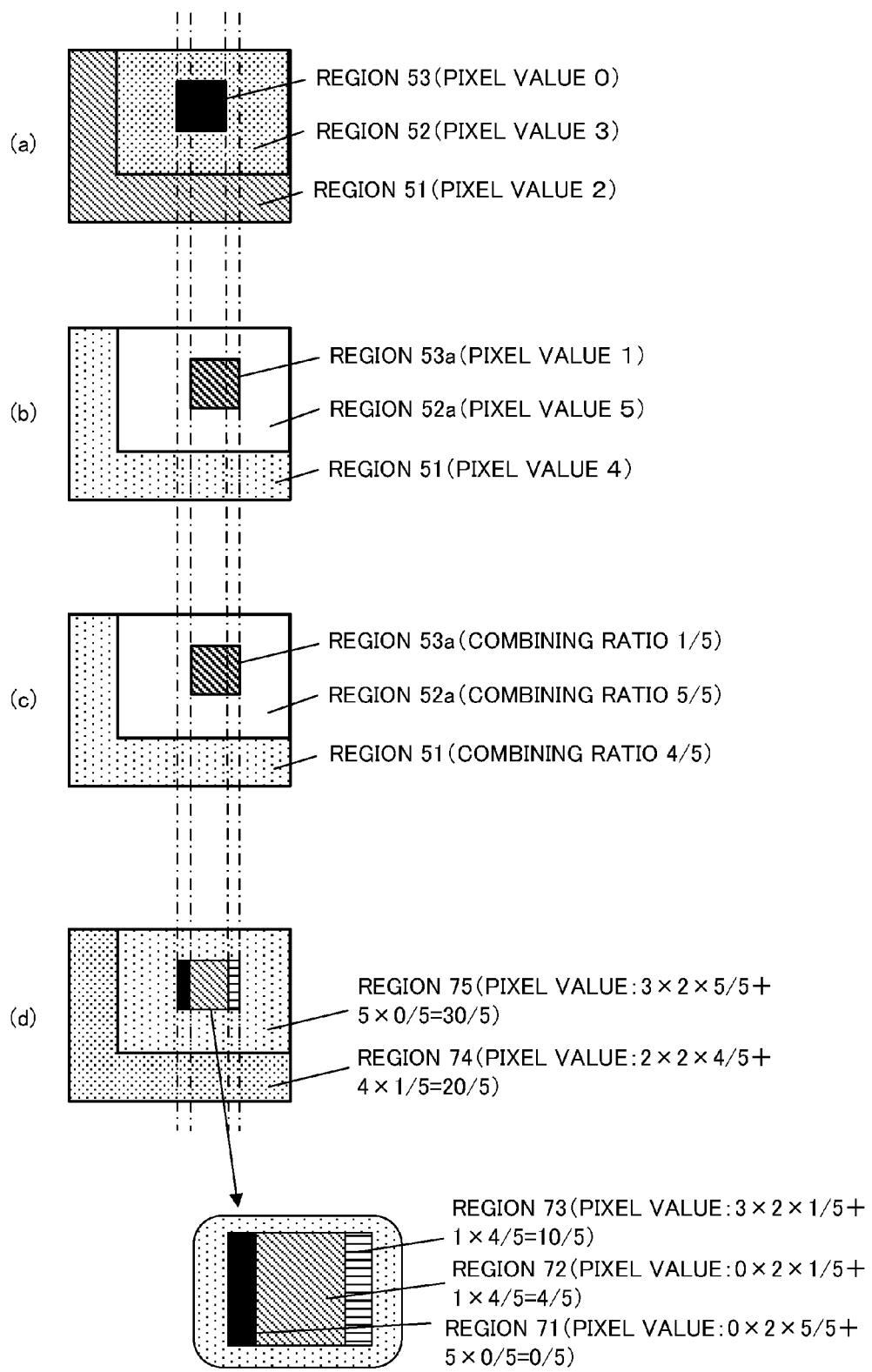
FIG. 8 is a diagram showing the creation process of the output image signal Sout when it is presupposed that a region 53a is a moving object and that the position offset correction of the present invention is not applied.
Figure 9:
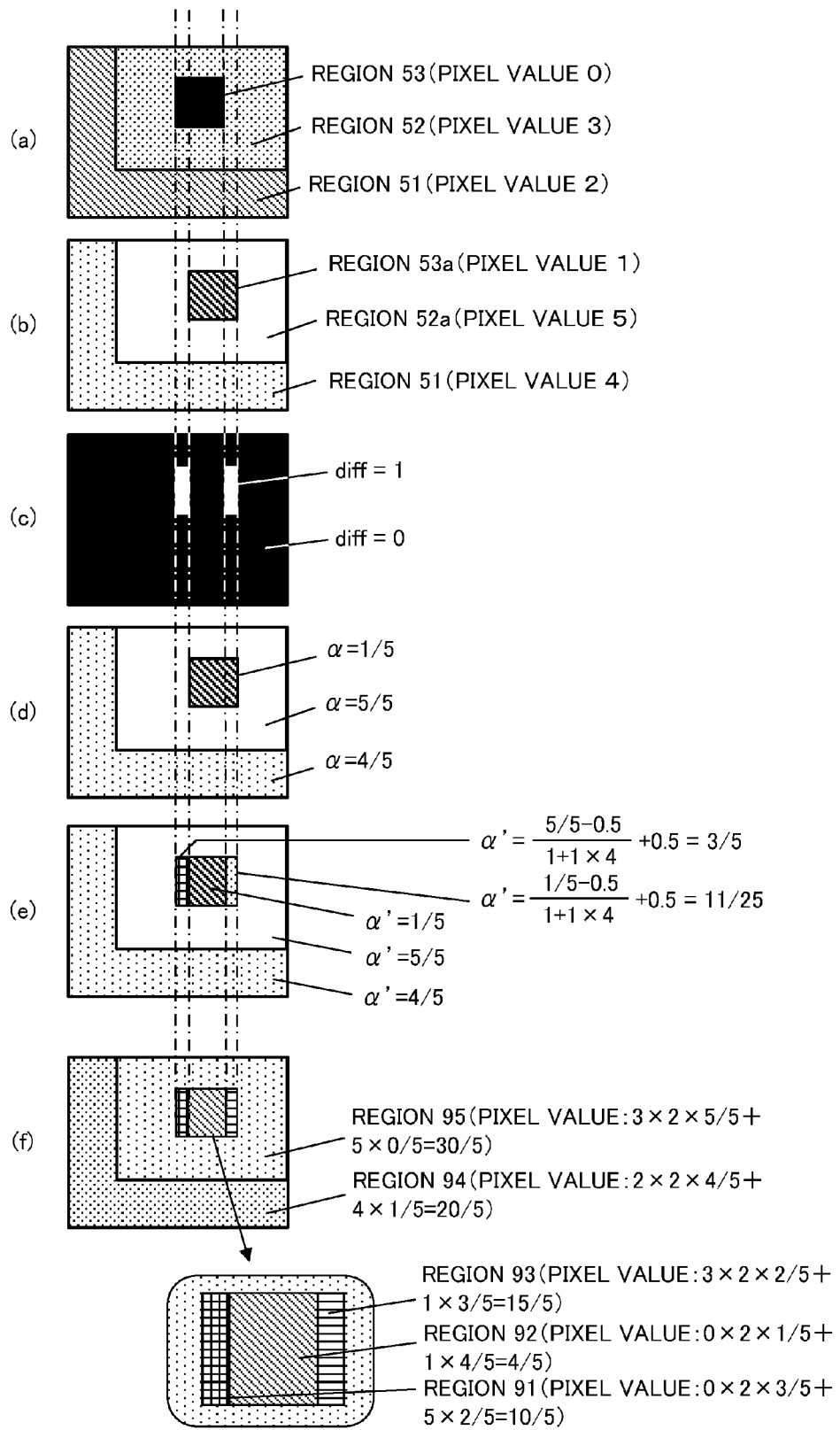
FIG. 9 is a diagram showing the creation process of the output image signal Sout when it is presupposed that a region 53a is a moving object and that the position offset correction of the present invention is applied.

Since an image blur shown in FIG. 8 and FIG. 9 is not a blur generated by combining images but is close to a moving blur generated on one image, a more natural image can be obtained as an image with an expanded dynamic range obtained by combining two images.

As mentioned above, according to the image processing apparatus according to the first embodiment, a position offset among a plurality of images is detected, and the combining ratio is calculated based on the pixel values of at least one image among the plurality of images and the amount of the detected position offset, and then the plurality of images are combined based on the calculated combining ratio. Thereby, generating of an unnatural twin image such as an under-exposure twin image originating from a position offset is suppressed, and a high-quality combined image with an expanded dynamic range can be obtained.

In particular, according to the image processing apparatus according to the first embodiment, since the combining ratio is calculated so that a plurality of images are equally combined as the amount of a detected position offset becomes large, generating of an unnatural twin image originating from the position offset can be suppressed effectively.

In addition, since the offset detection unit 220 detects a position offset between the signal Long_L and the signal Short_L, which are obtained by removing high-frequency components from the long-exposure image signal Long and the short-exposure image signal Short, the influence of noise is removed and the position offset can be detected with good accuracy.

Second Embodiment

An image processing apparatus according to a second embodiment combines three images with the different amount of exposure to create a combined image with an expanded dynamic range. Here, it is presupposed that the magnitude correlation of the amount of exposure for the image signals Sin1, Sin2 and Sin3 which have the different amount of exposure satisfies the following relation: Sin1>Sin2>Sin3.

Figure 10:
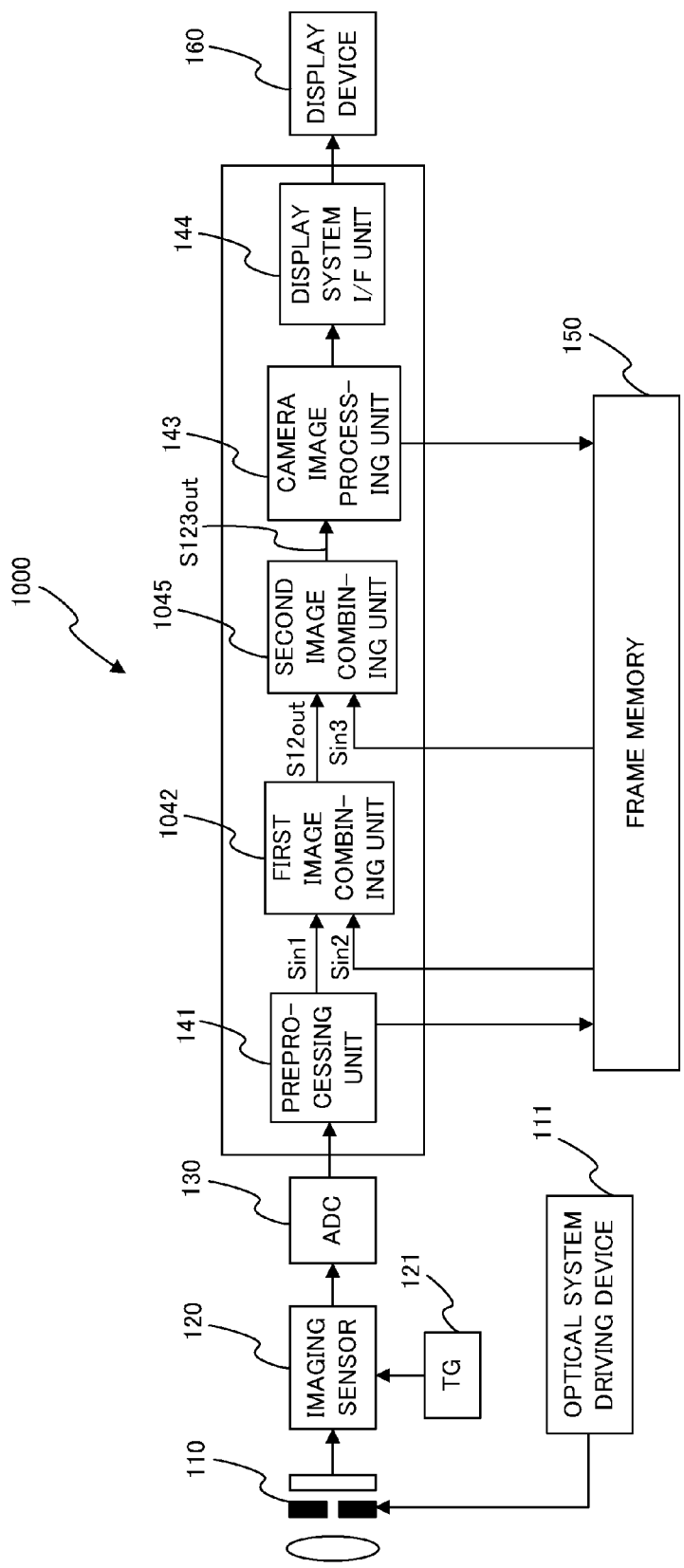
FIG. 10 is a block diagram showing the main configuration of an image processing apparatus according to the second embodiment of the present invention.

FIG. 10 is a block diagram showing the main configuration of an image processing apparatus 1000 according to the second embodiment of the present invention. For the same component as that of the image processing apparatus according to the first embodiment shown in FIG. 1, the same numeral is given and its detailed explanation is omitted. The image processing apparatus according to the second embodiment differs from the image processing apparatus 100 according to the first embodiment 100 with respect to the inside configuration of a signal processing unit 1040.

The signal processing unit 1040 comprises a preprocessing unit 141, a first image combining unit 1042, a second image combining unit 1045, a camera image processing unit 143 and a display system I/F unit 144.

The first image combining unit 1042 and the second image combining unit 1045 have the same function as that of the image combining unit 142 of the image processing apparatus 100 according to the first embodiment.

The first image combining unit 1042 creates an output image signal S12out by combining the image signal Sin1 and the image signal Sin2, and outputs the output image signal S12out to the second image combing unit 1045.

The second image combing unit 1045 creates an output image signal S123out by combining the output image signal S12out and the image signal Sin3, and outputs the output image signal S123out to the camera image processing unit 143.

As mentioned above, according to the image processing apparatus according to the second embodiment, even when three images with the different amount of exposure are combined, generating of an unnatural twin image originating from an position offset is suppressed and a high-quality combined image with an expanded dynamic range can be obtained, similarly to the image processing apparatus according to the first embodiment.

Although it is premised that the image processing apparatus is processed by hardware in the first and second embodiments mentioned above, the image processing apparatus is not necessarily processed by such a configuration. For example, a configuration is also possible where processing is performed by software in a different manner. In this case, the image processing apparatus comprises a CPU, a main memory such as a RAM, etc., and non-transitory computer readable storage media (storage device) on which a program for realizing all or part of the above mentioned processing is memorized. Here, this program is called an image processing program. The CPU reads out the image processing program memorized on the above-mentioned storage media and performs processing and computing processing, realizing similar processing to that of the above mentioned image processing apparatus.

Here, the non-transitory computer readable storage media (storage device) refers to a magnetic disk, a magneto-optical disk, a CD-ROM, a DVD-ROM, a semiconductor memory, etc. This image processing program may be distributed to a computer through a communication line and the computer receiving this distribution may execute the image processing program.

The present invention is not limited to the first and second embodiments mentioned above, and various modifications and applications are possible within a range where they do not depart from the gist of the present invention. For example, although the example of combining two images with the different amount of exposure was explained in the first embodiment and the example of combining three images with the different amount of exposure was explained in the second embodiment, four or more images with the different amount of exposure can be combined.

What is claimed is:

1. An image processing apparatus, comprising:
    an imaging unit which acquires a plurality of images with different exposure times;
    a position offset detection unit which detects an amount of a position offset between the plurality of images with the different exposure times;
    a combining ratio calculation unit which calculates a combining ratio in case of combining the plurality of images with the different exposure times based on pixel values of an image from among the plurality of images with a longest exposure time and the amount of the position offset detected by the position offset detection unit, wherein the combining ratio calculation unit calculates the combining ratio such that a combining ratio of a short-exposure image from among the plurality of images is larger in proportion to a magnitude of the pixel values of the image with the longest exposure time and such that the combining ratio of the plurality of images with the different exposure times approaches equality as the amount of the position offset detected by the position offset detection unit becomes larger; and
    an image combining unit which combines the plurality of images with the different exposure times based on the combining ratio calculated by the combining ratio calculation unit.

2. The image processing apparatus as defined in claim 1, wherein the combining ratio calculation unit:

calculates a first combining ratio based on the pixel values of the image with the longest exposure time; and calculates a second combining ratio based on the first combining ratio and the amount of the position offset detected by the position offset detection unit.

3. The image processing apparatus as defined in claim 1, wherein the imaging unit alternately acquires the image with the longest exposure time and the short-exposure image with a shortest exposure time.

4. The image processing apparatus as defined in claim 1, further comprising a high-frequency component removing unit which removes a high-frequency component from each of the plurality of images with the different exposure times,
    wherein the position offset detection unit detects the amount of the position offset between the plurality of images from which the high-frequency component is removed by the high-frequency component removing unit.

5. An image processing method comprising;

acquiring a plurality of images with different exposure times;

detecting an amount of a position offset between the acquired plurality of images with the different exposure times;

calculating a combining ratio in case of combining the plurality of images with the different exposure times based on pixel values of an image from among the plurality of images with a longest exposure time and the detected amount of the position offset, such that a combining ratio of a short-exposure image is larger in proportion to a magnitude of the pixel values of the image with the longest exposure time and such that the combining ratio of the plurality of images with the different exposure times approaches equality as the detected amount of the position offset becomes larger; and combining the plurality of images with the different exposure times based on the calculated combining ratio.

6. A recording device storing an image processing program, wherein the image processing program causes a computer to perform functions comprising:

acquiring a plurality of images with different exposure times;

detecting an amount of a position offset between the acquired plurality of images with the different exposure times;

calculating a combining ratio in case of combining the plurality of images with the different exposure times based on pixel values of an image from among the plurality of images with a longest exposure time and the detected amount of the position offset, such that a combining ratio of a short-exposure image is larger in proportion to a magnitude of the pixel values of the image with the longest exposure time and such that the combining ratio of the plurality of images with the different exposure times approaches equality as the detected amount of the position offset becomes larger; and combining the plurality of images with the different exposure times based on the calculated combining ratio.

* * * * *